United States Patent [19]

Leibensperger et al.

[11] Patent Number: 4,541,738
[45] Date of Patent: Sep. 17, 1985

[54] REFRIGERANT COOLED TAPERED ROLLER BEARING ASSEMBLY

[75] Inventors: Robert L. Leibensperger, Canton; Karl W. Reed, North Canton, both of Ohio

[73] Assignee: The Timken Company, Canton, Ohio

[21] Appl. No.: 522,096

[22] Filed: Aug. 11, 1983

[51] Int. Cl.$^4$ .................... F16C 37/00; F16C 33/66
[52] U.S. Cl. .................... 384/470; 184/622; 184/31; 384/473; 384/476; 384/572; 384/900
[58] Field of Search .................. 308/187, 207 R, 217, 308/218, 201, DIG. 14; 384/313, 317, 322, 900; 184/6.21, 6.22, 31, 104; 417/372; 62/468, 469, 470

[56] References Cited

U.S. PATENT DOCUMENTS

| | | | |
|---|---|---|---|
| 1,553,149 | 9/1925 | Doran | 184/6.21 |
| 1,728,268 | 9/1929 | Flanders | 184/6.21 |
| 2,606,747 | 8/1952 | Williams | 165/27 |
| 2,664,173 | 12/1953 | Karig | 184/6.22 |
| 2,853,948 | 9/1958 | Aspelin | 417/228 |
| 3,555,962 | 1/1971 | Wolf et al. | 409/231 |
| 3,628,835 | 12/1971 | Cornish et al. | 308/187 |
| 3,690,410 | 9/1972 | Sieghartner | 184/6.28 |
| 3,698,514 | 10/1972 | Buck et al. | 184/6.4 |
| 4,006,944 | 2/1977 | Ando et al. | 184/6.22 X |
| 4,181,379 | 1/1980 | Letts | 308/187 |
| 4,340,262 | 7/1982 | Rugh et al. | 308/187 |
| 4,375,156 | 3/1983 | Shaw | 62/468 |

Primary Examiner—Stuart S. Levy
Assistant Examiner—David Werner
Attorney, Agent, or Firm—Gravely, Lieder & Woodruff

[57] ABSTRACT

A bearing assembly for supporting the spindle of a machine tool includes a single row tapered roller bearing and a closure at each end of the bearing for isolating the interior of the bearing from the surrounding atmosphere. A liquid refrigerant and lubricating oil are mixed in the closure at the small ends of the rollers, and are directed into the space between the tapered raceways. This refrigerant, upon encountering the tapered rollers, the raceways along which the rollers roll, and the thrust rib against which the large ends of the rollers bear, vaporizes and extracts heat from those bearing components, thereby enabling the bearing to operate at a generally uniform temperature close to room temperature. The vaporized refrigerant flows through a port in the closure at the large ends of the rollers and then into a heat exchanger where it is condensed, the liquid refrigerant being then directed to the closure at the small ends of the rollers. The lubricating oil is likewise recirculated from the closure at the large roller ends to the closure at the small roller ends where it is again mixed with the refrigerant. The refrigerant and oil may be mixed in an inwardly opening trough carried by the cage beyond the small roller ends and may be directed through channels in the cage bridges to the outer raceway and the thrust rib.

26 Claims, 6 Drawing Figures

' # 4,541,738

REFRIGERANT COOLED TAPERED ROLLER BEARING ASSEMBLY

BACKGROUND OF THE INVENTION

This invention relates in general to bearings and more particularly to an antifriction bearing assembly that is cooled by a refrigerant and a process for cooling such a bearing.

Of all the antifriction bearings, tapered rollers are the best suited for use in precision machine tools, particularly for supporting the spindles of such tools. These bearings can carry extremely heavy loads, and are very durable. Furthermore, when mounted in pairs, the two bearings of the pair may be adjusted one against the other to eliminate radial and axial play, and this, of course, provides an extremely stable mounting for the spindle.

Despite these advantages, tapered roller bearings, like other types of bearings, generate heat during operation, with the primary source of this heat being the region of contact between the roller bodies and the raceways, although some heat derives from the friction between the large end faces of the rollers and the thrust rib against which they bear. This heat soaks into the bearing components and the surrounding components of the machine tool and causes those components to undergo dimensional changes. Lubrication systems exist for reducing the friction to the extent that it will not damage the bearing nor require excessive power to turn the spindle, but these systems do not adequately control the temperature, at least to the extent that the temperature remains substantially constant during the operation of the machine tool, that is, from start up through a wide range of speeds. Indeed, to avoid dimensional changes, the bearings should operate at or near room temperature irrespective of the speed of the spindle.

SUMMARY OF THE INVENTION

One of the principal objects of the present invention is to provide a bearing assembly having an improved cooling system. Another object is to provide a bearing assembly of the type stated which operates at a substantially constant temperature. A further object is to provide a bearing assembly of the type stated which operates near room temperature. An additional object is to provide a bearing assembly of the type stated that is ideally suited for use in machine tools. Still another object is to provide a bearing assembly of the type stated that utilizes the latent heat of evaporation for a refrigerant to extract heat from the bearing. Yet another object is to provide a process for cooling a tapered roller bearing with a liquid refrigerant. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Figure 1:
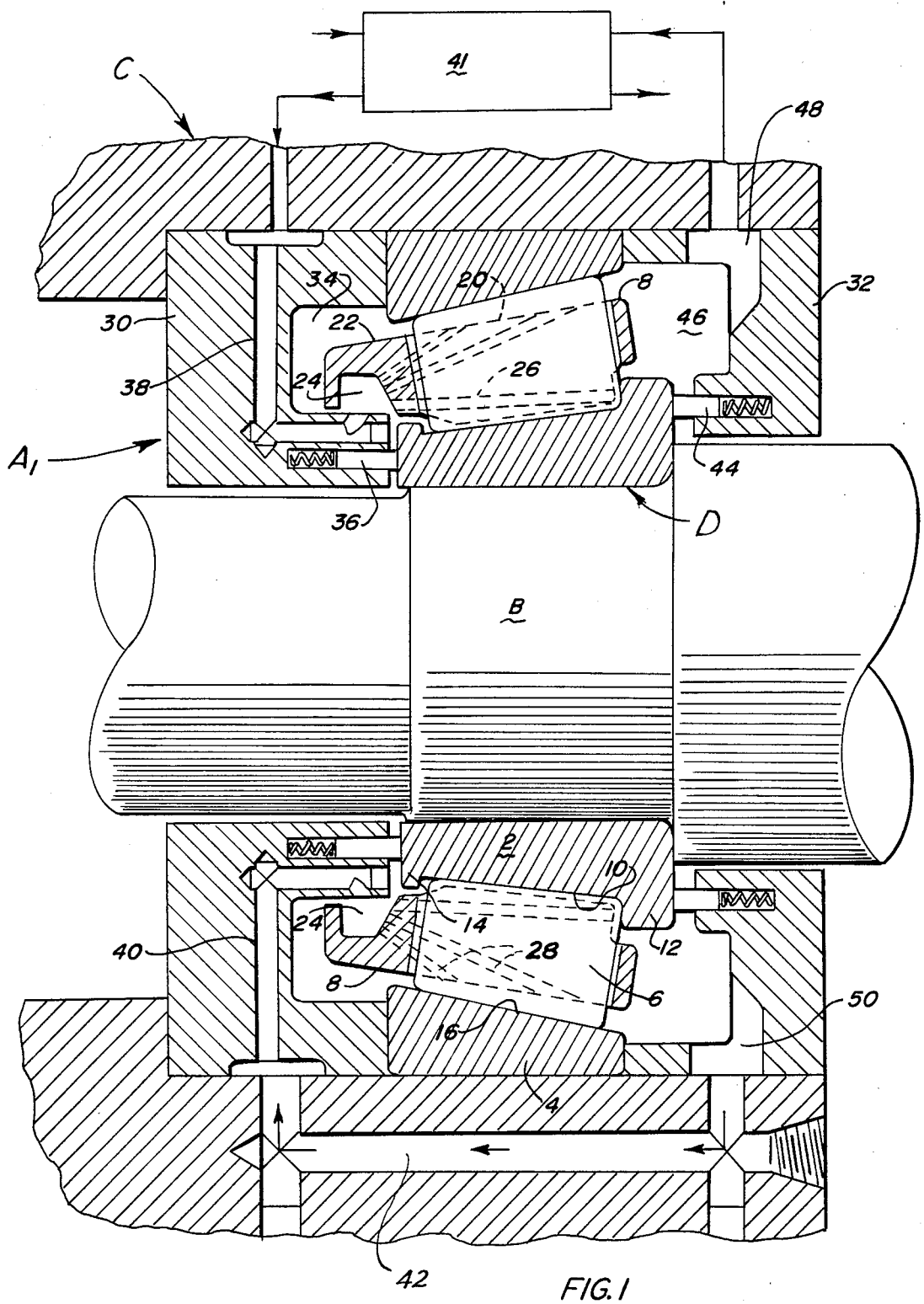
FIG. 1 is a sectional view of a bearing assembly constructed in accordance with and embodying the present invention.

Referring now to the drawings, a bearing assembly $A_1$ (FIG. 1) is one of two that supports a spindle B within a housing or head C of a machine tool. Each bearing assembly $A_1$ includes a single row tapered roller bearing D which for the most part is conventional, and the bearing D of the one assembly $A_1$ is positioned such that it may be adjusted against the bearing D of the other assembly $A_1$. Indeed, the bearings D are adjusted to a condition of slight preload so that no axial or radial play exists within them or the spindle B that they support.

The tapered roller bearing D includes a cone 2 that is fitted tightly to the spindle B, a cup 4 that fits snugly into the head C and encircles the cone 2, tapered rollers 6 arranged in a single row between the cone 2 and cup 4, and a cage 8 that fits between the cone 2 and cup 4 and maintains proper spacing between adjacent tapered rollers 6. The cone 2 has an outwardly presented tapered raceway 10, a thrust rib 12 at the large end of the raceway 10, and a retaining rib 14 at the small end. All are an integral part of the cone 2. The end of cone 2 at which the thrust rib 12 is located constitutes the back face of the cone 2, and it is through this face that thrust loads are transmitted between the bearing D and the spindle B. The cup 4 has an inwardly presented tapered raceway 16 that surrounds the cone raceway 10. The end of the cup 4 which is at the small end of the raceway 16 constitutes the back face of the cup 4, and it is through this face that thrust loads are transferred between the bearing D and the head C.

The tapered rollers 6 fit between the raceways 10 and 16 of the cone 2 and cup 4, respectively, and contact the raceways 10 and 16, there being line contact between each roller 6 and the two raceways 10 and 16. Moreover, the rollers 6 are on apex, meaning that the rollers 6, and the two raceways 10 and 16 as well, if extended to apices, would have those apices located at a common point along the axis of the bearing D. This results in pure rolling contact between the rollers 6 and raceways 10 and 16 when the bearing D is in operation. The large end faces of the rollers 6, on the other hand, bear against the thrust rib 12, and as the bearing D operates those end faces both slide and roll along the thrust rib 12. Furthermore, the rollers 6 contact the two raceways 10 and 16. These areas of contact along the raceways 10 and 16 and along the rib 12 are the primary source of friction and heat within the bearing D.

The cage 8, like the complement of rollers 6, fits between the raceways 10 and 16 of the cone 2 and cup 4, respectively. It may be molded from a polymer, and has pockets in which the tapered rollers 6 are received. The pockets are large enough to permit the rollers 6 to revolve freely within the cage 8, yet are configured such that the rollers 6 will be retained around the cone 2 when the cone 2 is withdrawn from the cup 4. The sides of the pockets are defined by bridges 20 which at the small or nose end of the cage 8 merge into a ring 22 that extends circumferentially past the small end faces of the rollers 6 and further projects axially beyond the back face of the cup 4. The ring 22 contains an annular groove 24 which opens inwardly toward the spindle B. At least some of the bridges 20 contain axially directed passageways 26 that lead from the groove 24 to the opposite ends of the bridges 20 where they open out of the bridges 20. Likewise, some of the bridges 20 contain passageways 28 that lead from the groove 24 to the radially outwardly presented surfaces of the bridges 20 out of which they open.

The feed ends of the passageways 26 and 28 are positioned radially inwardly from the base of the groove 24, so that a full ring of liquid will collect in the groove 24 under the influence of centrifugal force before spilling into the passageways 26 and 28. Moreover, the feed ends are located slightly closer to the axis of the bearing D than the discharge ends, so that liquid will flow through the passageways 26 and 28 under the influence of centrifugual force. The discharge ends of the passageways 26 are presented close to and open toward that face of the thrust rib 12 against which the large end faces of the rollers 6 bear. Indeed, the discharge ends open generally toward the intersection of that surface and the cone raceway 10. The discharge ends of the passageways 28, on the other hand, open toward the raceway 16 of the cup 4.

In addition to the bearing D, each bearing assembly $A_1$ includes two end closures 30 and 32 which likewise fit snugly within the head C and encircle the spindle B. Indeed, the bearing D is interposed between the two closures 30 and 32, and the closures 30 and 32 in effect isolate the interior of the bearing D, that is the space between the two raceways 10 and 16, from the surrounding atmosphere.

The end closure 30 possesses an annular configuration, it having a bore through which the spindle B extends with relatively little clearance. Along its outer surface the closure 30 fits snugly into the head C, one end of the closure 30 being against a shoulder within the head C, while the other end abuts the back face of the bearing cup 4. The closure 30 contains an annular cavity 34 which opens axially toward the interior of the bearing D and receives the cage ring 22 which projects beyond the back face of the cup 4. Inwardly, from the cavity 34, the closure 30 carries an annular face seal 36 which bears against the front face of the cone 2. The face seal 36 is spring biased against the cone 2, but the spring load is relatively light so that little friction develops at the seal 36.

In addition, the end closure 30 contains upper and lower channels 38 and 40 which are essentially the same configuration, the channels 38 and 40 differing only in location. Each channel 38 and 40 has its feed end at the outer surface of the closure 30 and its discharge end along the inner of the two axial walls that form the cavity 34. Indeed, the discharge ends of the channels 38 and 40 are located such that they are presented directly opposite to the groove 24 in the end ring 22 of the cage 8, so that liquid flowing out of the channels 38 and 40 will flow into the groove 24 of the cage 8. The feed end of the upper channel 38 extends upwardly and is connected to a heat exchanger 41 located outside of the head C. The feed end of the lower channel 40 extends downwardly into a circulation channel 42 that is located within the head C.

The other end closure 32 is likewise annular in configuration, fitting snugly into the head C and having a bore through which the spindle B passes. One end of the closure 32 abuts the front face of the cup 4, yet that same end is spaced slightly from the back face of the cone 2. Here the closure 32 is provided with a face seal 44 which is spring biased against the back face of the cone 2. Again the spring load is relatively light so that little friction and heat develop at the cone back face. In addition, the closure 32 contains a cavity 46 that is located opposite to the large ends of the tapered rollers 6 and also upper and lower ports 48 and 50 which lead away from the cavity 46 and open out of the outer surface of the closure 32. The upper port 48 communicates with the heat exchanger 41, while the lower port opens into the circulation channel 42.

The interior of the bearing D as well as the annular cavities 34 and 46 at each end of the bearing D are partially filled with a mixture of liquid refrigerant and lubricating oil. Indeed, the mixture should initially occupy 60 to 75 percent of the space formed by the interior of the bearing D and the cavities 34 and 46 at each end of it. The oil is preferably soluble in the refrigerant. The refrigerant, on the other hand, should have a relatively high latent heat of vaporization and should boil near or slightly above room temperature. Suitable refrigerants are sold under the name Freon, and these refrigerants boil generally between 75° and 118° F. at atmospheric pressure. The proportion of refrigerant to oil depends on the physical characteristics of the refrigerant, the thermodynamic characteristics of the bearing D, the speed and other conditions under which it operates, and the size of the heat exchanger 41. A mixture of 20 parts refrigerant to one part oil will generally suffice where Freon is the refrigerant.

When the bearing D is set into operation, friction develops between the bodies of the tapered rollers 6 and the raceways 10 and 16 as well as between the large end faces of the rollers 6 and the thrust rib 12. This friction produces heat which in time raises the temperature of the refrigerant to its boiling point. Indeed, some of the refrigerant vaporizes and in so doing extracts heat from the cone 2 and cup 4, and particularly from the vicinities of the raceways 10 and 16 and the region of the thrust rib 12. The vaporized refrigerant fills the cavity 46 in the end closure 32 and further escapes through the port 48 into the heat exchanger 41. Aside from extracting heat, the liquid refrigerant serves as a carrier for the lubricating oil and indeed brings the oil to the thrust rib 12 and the raceways 10 and 16 where the friction develops. The oil reduces the friction at these regions and thereby prevents the critical surfaces of those regions from being scarred or otherwise damaged.

When an equilibrium condition is reached, less refrigerant remains in the liquid phase, at least insofar as the interior of the bearing D and the end cavity 46 are concerned. Moreover, the refrigerant is circulated continuously through the interior of the bearing D and the heat exchanger 41. More specifically, the refrigerant upon vaporizing passes into the cavity 46 in the end closure 32, and from there escapes through the port 48 into the heat exchanger 41. Within the heat exchanger 41 the vaporized refrigerant is cooled and converted back to a liquid which flows into the upper channel 38 of the end closure 30. The liquid refrigerant is discharged from the channel 38 at the inner surface of the cavity 34 in which end ring 22 of the cage 8 revolves, and indeed enters grooves 24 in that end ring 22. Since the cage 8 turns with the set of rollers 6, the refrigerant is subjected to centrifugal forces which hold it in the groove 24, or at least prevent it from flowing out of the mouth of the groove 24. The lubricating oil within the cavity 46 likewise enters the groove 24 where it mixes with the liquid refrigerant. Thus, a ring of liquid refrigerant and oil, mixed together, collects within the groove 24. The addition of more liquid refrigerant and oil to this ring causes the liquid mixture to spill over into the axially directed passageways 26 and 28 in the cage bridges 20. The passageways 26 direct the refrigerant-oil mixture through the bearing D and discharge it against that face of the thrust rib 12 against which the large end faces of the rollers 6 bear. The passageways 28, on the other hand, direct the refrigerant-oil mixture to cup raceway 16. Some of the mixture also splashes into the rollers 6 and the cone raceway 10. In any event, the liquid refrigerant-oil mixture, after being discharged from the passageways 26 and 28 of the cage bridges 20, comes against surfaces that are relatively warm and here the liquid refrigerant for the most part vaporizes again, thereby extracting heat from those surfaces. The oil, of course, serves to provide a low friction film between rollers 6, on one hand, and the raceways 10 and 16 and thrust rib 12 on the other. The cycle then repeats, over and over again.

Some of the refrigerant remains in the liquid phase and flows with the oil which likewise passes into the cavity 46 in the end closure 32, and indeed the mixture of liquid refrigerant and oil is actually pumped by the rollers 6 into the cavity 46. The liquid mixture gravitates to the bottom of the cavity 46 where it flows into the lower port 50, which in turn directs the oil to the circulation channel 42 in the head C. The circulation channel 42 brings the liquid mixture of oil and refrigerant to the lower channel 40 in the end closure 30, and from the lower channel 40 the mixture is discharged into the cavity 34.

Not all of the lubricating oil and liquid refrigerant enters the groove 24 in the small end ring of the cage 8, but instead much of it finds its way into the space between the two raceways 10 and 16. This liquid mixture is pumped through the bearing D and in so doing passes over the raceways 10 and 16 and the bodies of the rollers 6. Some of it comes to the thrust rib 12 where it serves the same purpose as the mixture and oil discharged from the passageways 26 in the cage bridges 20. In this regard, the rollers 6 effect a natural pumping action which moves the oil and liquid refrigerant from the small diameter ends of the rollers 6 and raceways 10 and 16 to the large diameter ends.

Thus, oil and the refrigerant circulate continuously through the bearing D. The oil reduces friction at critical surface areas, that is along the raceways 10 and 16 and along that surface of the thrust rib 12 against which the large ends of the rollers 6 bear. The refrigerant, by undergoing a change of phase, extracts a considerable amount of heat from the bearing D and enables the bearing D to operate at a relatively low and uniform temperature.

Figure 2:
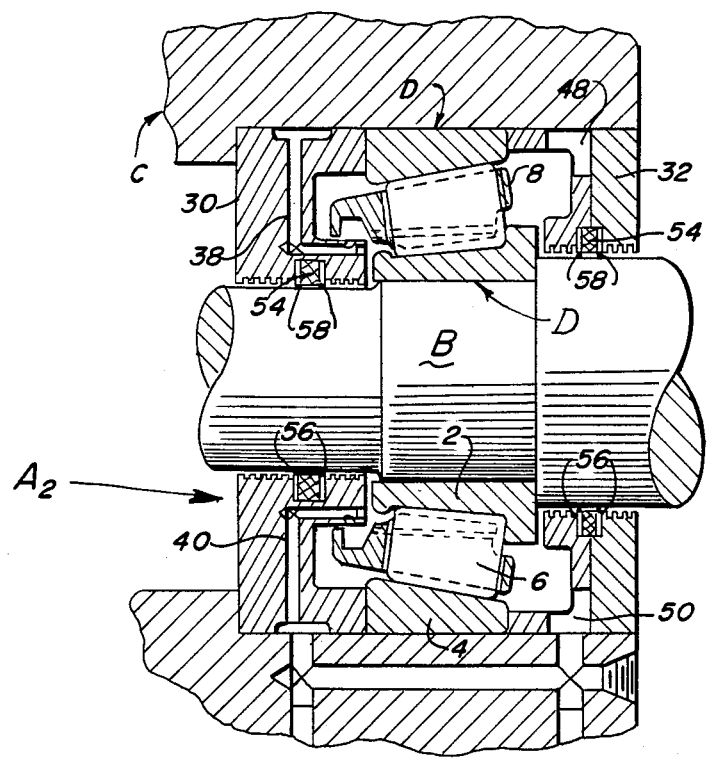
FIG. 2 is a sectional view of a modified bearing assembly.

In a modified bearing assembly $A_2$ (FIG. 2) the face seals 36 and 44 are replaced by magnetic seals. More specifically, each end closure 30 and 32 is formed from a nonmagnetic substance and contains an annular permanent magnet 54 and two annular pole pieces 56 between which the magnet 54 is located. All encircle the spindle B. Moreover, the clearance between each end closure 30 and 32 and the spindle B is quite small and the clearance between the pole pieces 56 and the spindle B is even less, the latter ranging between, 0.002 and 0.010 inches. Within this space is a carrier liquid 58 containing solid magnetic particles which are very small and are in suspension. The magnets 54 create fields in the region of the pole pieces 56, and these fields maintain the carrier liquid 58 and magnetic particles in the thin annular gaps between the pole pieces 56 and spindle B, so that those gaps are completely filled. The liquid 58 and its magnetic particles, together with the magnet 54 and its pole pieces 56 constitute a magnetic seal that isolates the interior of the bearing D within the bearing assembly $A_2$.

Figure 3:
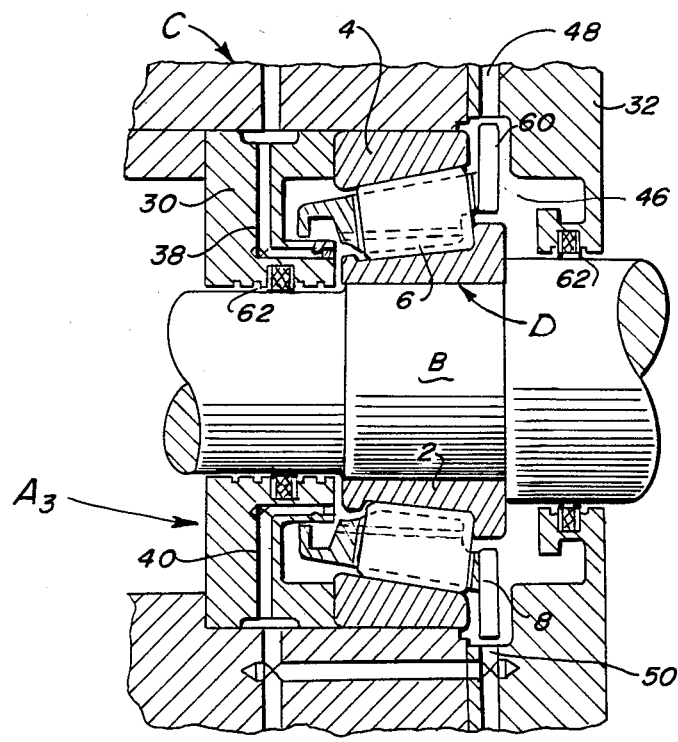
FIG. 3 is a sectional view of another modified bearing assembly.

In another modified bearing assembly $A_3$ (FIG. 3) the cage 8 of the bearing D is at its large end provided with blades 60 which revolve within the cavity 46 of the end closure 32. The blades 60 serve to circulate the refrigerant and oil by moving the vaporized refrigerant into the upper port 48 of the closure 32 and the remaining mixture of oil and liquid refrigerant into the lower port 50. The end closures 30 and 32 are formed from a nonmagnetic material and contain magnetic seals 62 instead of face seals 36 and 44.

Figure 4:
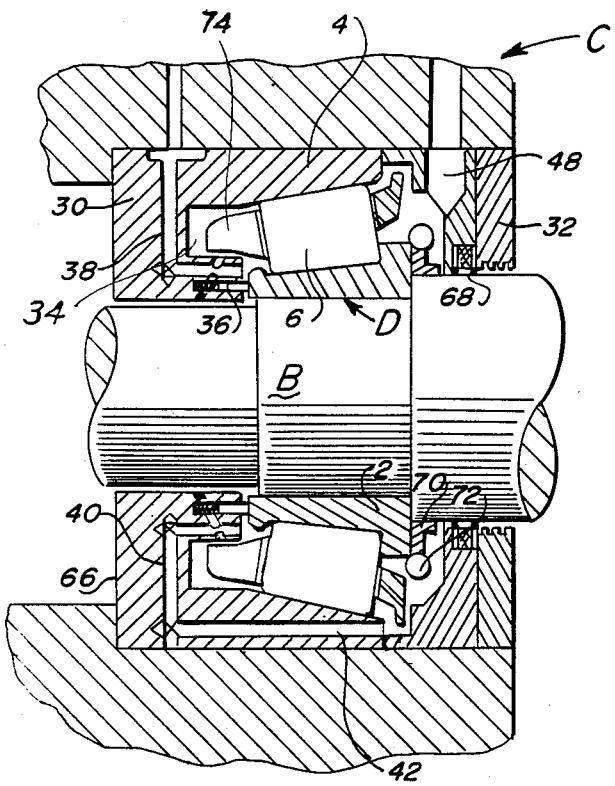
FIG. 4 is a sectional view of still another modified bearing assembly.

In still another modified bearing assembly $A_4$ (FIG. 4) the bearing cup 4 and the end closure 30 are integrated into a single unit 66 and are thereby formed in the same machining operation. The integrated unit 66 contains a face seal 36 which bears against the front face of the cone 2. It also includes the oil circulation channel 42 which at one end opens out of the front face of the cup 4 for the unit 66, and at its opposite end intersects the lower channel 40 for the end closure 30 of the unit 66. The end closure 32 at the opposite end of the bearing may contain a magnetic seal 68, and if it does, the end closure 32 should be formed from a nonmagnetic substance. Also the spindle B may be provided with an impeller 70 adjacent to the back face of the cone 2, and the impeller 70 has blades 72 which revolve in the cavity 46. The impeller 70 and its blades 72 direct the vaporized refrigerant into the upper port 48 of the end closure and force the remaining mixture of oil and liquid refrigerant into the lower port 50. Indeed, the impeller 70 forces the oil and liquid refrigerant through the oil circulation channel 42, and into the lower channel 40 of the end closure 30, causing it to issue from the channel 40 and enter the cavity 34 where it is again circulated through the bearing D. The cage 8 for the bearing D of the modified bearing assembly $A_4$ does not at its small end have a groove 24, but is instead provided with mixing blades 74 which move through the cavity 34 and thoroughly mix the liquid refrigerant and the lubricating oil within that cavity. The bearing D of the modified assembly $A_4$ utilizes the natural pumping action of the tapered rollers 6 to circulate the mixture of liquid refrigerant and oil through the bearing D.

Figure 5:
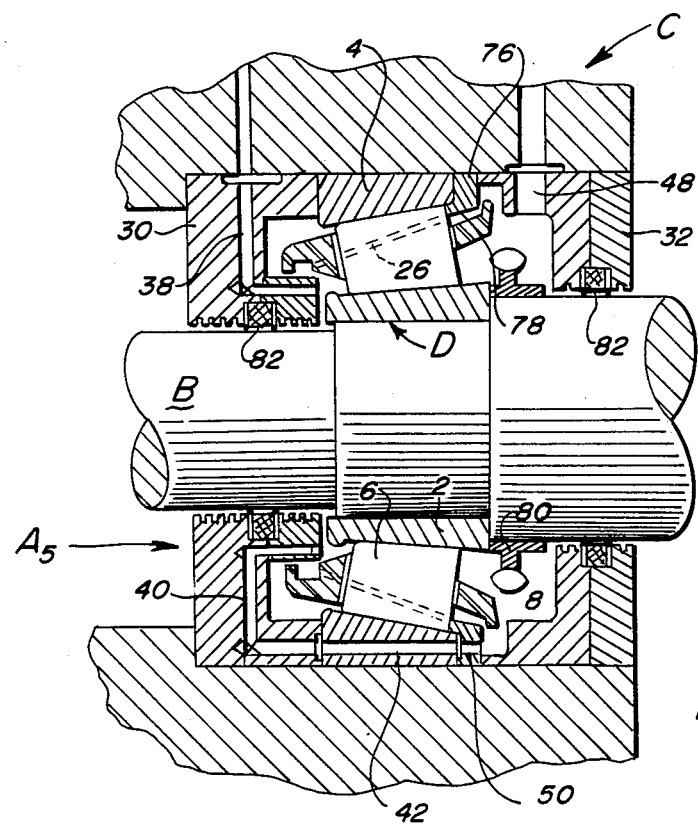
FIG. 5 is a sectional view of yet another modified bearing assembly.

In yet another modified bearing assembly $A_5$ (FIG. 5), the thrust rib 12 is eliminated from the cone 2 and replaced with a rib ring 76 located at the large diameter end of the cup raceway 16. Actually, the rib ring 76 abuts and indeed is clamped against the front face of the cup 4. It possesses a rib 78 which projects a short distance along the cup raceway 16, and it is against the end face of this rib 78 that the large diameter ends of the tapered rollers 6 bear. The passageways 26 in the bridges 20 for the cage 8 have their ends located directly opposite the end face for the rib 78, and as a consequence those passageways are somewhat more oblique than the passageways 26 of the bearing assembly $A_1$. Also, the oil circulation channel 42 is not in the head C, but instead passes axially through the cup 4. The lower port 50 from the end closure 32 is transposed to the rib ring 76, and moreover, the lower channel 40 of the end closure 30 further includes an initial lateral section that meets and aligns with the channel 42 in the cup 4. Finally, the bearing assembly $A_5$ has an impeller 80 on the spindle B adjacent to the back face of the cone 2, and this impeller directs the vaporized refrigerant into the upper port 48 of the end closure 32 and the liquid oil and refrigerant into the circulation channel 42 of the rib ring 76 and cup 4. The gaps between the end closures 30 and 32 may be sealed with magnetic seals 82, in which case the enclosures 30 and 32 should be made from a nonmagnetic material.

Figure 6:
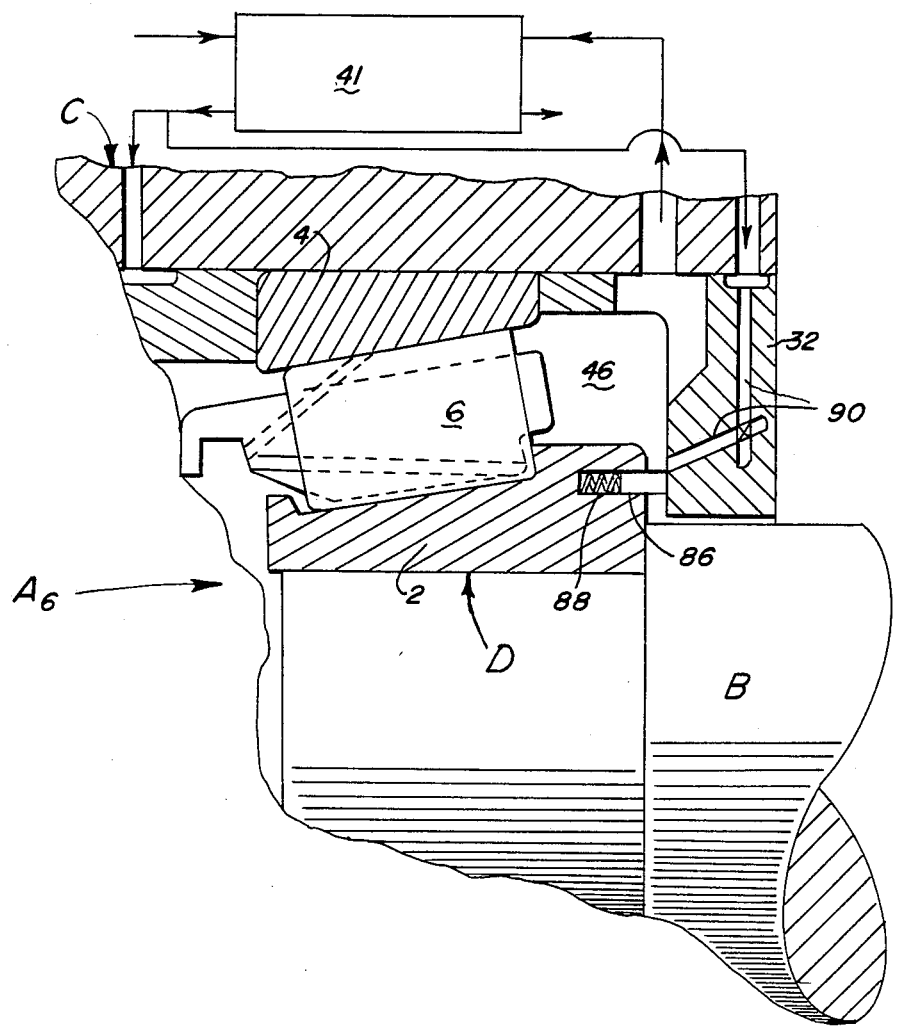
FIG. 6 is a sectional view of a further modified bearing assembly.

While magnetic seals operate without friction and therefore do not generate heat, they attrack ferrous metal debris. In some machine tools where small chips are produced, it may not be desirable to have a magnetic seal at the end closure 32 that is presented closest to the cutting tool. Face seals may be better suited for that end closure 32. In a further modified bearing assembly $A_6$ (FIG. 6), a face seal 86 for the end closure 32 is carried by the cone 2 and bears against the end closure 32. To this end, the cone 2 is provided with an annular groove 88 which is directed axially and opens out of the cone back face, which is spaced slightly from a radially directed face on the end closure 32. The face seal 86 fits into the groove 88 and is urged against the radial face of the closure 32 by springs that are in the cone 2. In order to better dissipate heat resulting from the friction created by the face seal 86, the end closure 32 contains several refrigerant channels 90 which lead inwardly from the head C and open into the cavity 46 immediately outwardly from the face seal 86. The channels 90 are connected through suitable piping to the refrigerant discharge port of the heat exchanger 41. Thus, some of the liquid refrigerant is diverted through the channels to be discharged against the face seal 86. This refrigerant vaporizes at the seal 86, and extracts heat from the cone 2 and end closure 32 in the region of the seal 86.

Of course, the various features of the five bearing assemblies $A_1$, $A_2$, $A_3$, $A_4$, $A_5$, and $A_6$ may be interchanged among the assemblies. Also, similar concepts may be incorporated into other types of antifriction bearings, such as angular contact ball bearings, to cool such bearings with a liquid refrigerant.

This invention is intended to cover all changes and modifications of the example of the invention herein chosen for purposes of the disclosure which do not constitute departures from the spirit and scope of the invention.

What is claimed is:

1. A bearing assembly comprising: a tapered roller bearing including a cone having an outwardly presented tapered raceway, a cup having an inwardly presented tapered raceway that surrounds the raceway of the cone, a thrust rib at the large diameter end of one of the raceways, tapered rollers located between and contacting the raceways of the cup and cone and further having their large end faces against the thrust rib, and a cage for maintaining the correct spacing between the rollers; a first closure at one end of the bearing and containing a supply channel that leads generally to the space between the small ends of two raceways for the bearing; a second closure at the opposite end of the bearing and containing a port that leads away from the space between the two raceways, such that a gas in the isolated space may escape through the port, but not a liquid, the two closures isolating from the surrounding atmosphere the space between the two raceways; means defining a circulation channel that extends from that end of the isolated space at the second closure to the supply channel in the first closure, the circulation channel opening into the isolated space at the second closure such that a liquid in the space at the second closure will drain to and into the circulation channel; a liquid mixture of refrigerant and oil which circulates through the isolated space and channels when the rollers roll along the raceways, the refrigerant having a boiling point substantially lower than the oil so that it will vaporize in the vicinity of the rollers, raceways and thrust rib when they are above the boiling point of the refrigerant, whereby the refrigerant will absorb heat from the cone, cup, rollers, and thrust rib; and a heat exchanger connected to the isolated space at both the first and second closures, with the connection at the second closure being at the port so that vaporized refrigerant will pass into the heat exchanger, the heat exchanger being capable of condensing the refrigerant back to a liquid, whereby the refrigerant is discharged into the space at the first closure as a liquid.

2. A bearing assembly according to claim 1 wherein the cage contains means for collecting a liquid refrigerant discharged from the supply channel and for further directing that liquid against a surface of the cone or cup against which the tapered rollers bear.

3. A bearing assembly according to claim 1 wherein the cage includes an end ring that projects into the first closure and bridges that extend between adjacent rollers, the end ring having a groove that opens toward the axis of the bearing and is located opposite the discharge end of the supply channel in the first closure so that liquid discharged from the supply channel will enter the groove, the bridges containing passageways that lead from the groove in the end ring and open toward a surface against which the tapered rollers bear, so that the liquid is discharged against that surface.

4. A bearing assembly according to claim 1 wherein the first and second closures carry face seals that bear against the ends of the cone.

5. A bearing assembly according to claim 1 wherein the second closure contains a cavity located opposite to the large ends of the tapered rollers; wherein the port of the second closure leads away from the cavity; and further comprising an impeller having blades that move through the cavity to direct vaporized refrigerant within the cavity to the port.

6. A process for cooling a tapered roller bearing including a cone having an outwardly presented tapered raceway, a cup having an inwardly presented tapered raceway surrounding the raceway of the cone, a thrust rib at the large end of one of the raceways, tapered rollers located between and contacting the raceways of the cone and cup and further having their large ends against the thrust rib, and a cage for maintaining the proper spacing between the rollers, the raceways and thrust rib all constituting surfaces against which the tapered rollers bear, said process comprising: directing a liquid mixture of refrigerant and oil toward at least one of the surfaces against which the tapered rollers bear, the boiling point of the oil being greater than the boiling point of the refrigerant; vaporizing the refrigerant with heat generated by friction between said one surface and the rollers which move along it, whereby heat is extracted from the bearing and the bearing operates at a relatively low temperature; leaving a film of oil on said one surface after the refrigerant vaporizes so that said one surface is well lubricated; thereafter collecting the oil and the vaporized refrigerant in the region of the larger ends of the tapered rollers; returning the collected oil through a channel to the location where the mixture of oil and refrigerant is directed toward the surfaces against which the tapered rollers bear; passing the collected vaporized refrigerant through a separate channel containing a condenser; condensing the vaporized refrigerant back to a liquid in the condenser; and returning the liquid refrigerant to the location where the mixture of oil and refrigerant is directed toward the surfaces against which the tapered rollers bear.

7. The process according to claim 6 and further comprising collecting the liquid mixture of refrigerant and oil in the cage and conveying it axially through the cage to said one surface.

8. The process according to claim 6 wherein the liquid mixture of refrigerant and oil is conveyed through the cage in the regions between adjacent rollers that are separated by the cage.

9. In combination with a spindle and a head in which the spindle revolves, an improved bearing assembly for supporting the spindle within the head to enable the spindle to rotate therein, said bearing assembly comprising: an inner race on the spindle and having an outwardly presented raceway; an outer race within the head and having an inwardly presented raceway located opposite to the raceway of the inner race; rolling elements arranged in a row between the two races and contacting the raceways so as to roll along the raceways when one race turns relative to the other; enclosing means for isolating from the surrounding atmosphere a generally annular space having first and second ends and including the space between the two raceways, so that the rolling elements are in the isolated space between the first and second ends of that space; a channel connecting the first and second ends of the isolated space outside of that space, the channel opening into the second end of the isolated space such that a liquid at that end will enter the channel to be transferred to the first end; a liquid mixture of refrigerant and oil which circulates through the isolated space and channel as the rolling elements move along the raceways, the refrigerant having a boiling point lower than that of the oil so that the refrigerant will evaporate in the isolated space when the temperature of the races and rolling elements exceeds the boiling point of the refrigerant to extract heat from the rollers and races; and a heat exchanger connected to and interposed between the two ends of the isolated space, with the connection at the second end being such that vaporized refrigerant will flow from the isolated space into the heat exchanger, the heat exchanger being of sufficient capacity to condense the vaporized refrigerant back to a liquid, whereby the refrigerant enters the isolated space at its first end as a liquid to be thereafter recirculated through the annular space between the raceways.

10. The combination according to claim 9 wherein the oil is soluble in the refrigerant.

11. The combination according to claim 9 wherein the refrigerant boils near or slightly above room temperature.

12. The combination according to claim 11 wherein the refrigerant boils between about 75° F. and about 118° F. at atmospheric pressure.

13. The combination according to claim 9 and further comprising means for circulating the liquid mixture through the isolated space from the first end to its second end of that space, whereby the liquid mixture returns through the channel to the first end.

14. The combination according to claim 13 wherein the means for circulating the liquid mixture includes a cage having passageways extended through it and means for directing the liquid mixture into the passageways.

15. The combination according to claim 13 wherein the inner race is a cone and its raceway is tapered, the outer race is a cup and its raceway is tapered, and the rolling elements are tapered rollers that contact the tapered raceways; wherein the combination further comprises abutment means located at the large end of one of the raceways such that the large end faces of the tapered rollers bear against the abutment means and the abutment means thereby axially positions the rollers between the raceways; and wherein the means for circulating the liquid mixture through the isolated space directs the liquid mixture against the abutment means.

16. The combination according to claim 15 wherein the enclosing means comprises a first end closure located at the first end of the isolated space opposite to the small ends of the tapered rollers and a second end closure located at the second end of the isolated space opposite to the large ends of the tapered rollers, the first end closure containing a portion of the channel for conveying liquid between the ends of the isolated space and the second closure containing a port for allowing vaporized refrigerant to escape from the space isolated by the enclosing means.

17. The combination according to claim 16 wherein the enclosure means further includes a face seal carried by one of the closures and being between the end of the cone and said one closure.

18. The combination according to claim 17 wherein said one closure contains a channel that leads up to the face seal for directing liquid lubricant against the face seal.

19. The combination according to claim 16 wherein the enclosing means further comprises magnets and pole pieces located within one of the closures and encircling the spindle beyond the end of the cone for creating a magnetic field in the region of the encircled surface areas on the spindle, there being a small clearance between each pole piece and the surface area of the spindle that it encircles, and a liquid containing magnetic particles located in the space between each pole piece and the encircled surface area of the spindle.

20. The combination according to claim 16 wherein the first closure contains a cavity located beyond the small ends of the tapered rollers, and further comprising a cage for maintaining the proper spacing between the tapered rollers, the cage having blades which move through the cavity of the first closure and mix the liquid refrigerant and lubricating oil in that cavity.

21. The combination according to claim 16 wherein the means for circulating the liquid mixture comprises a cage having means for collecting liquid mixture as it is discharged from the channel in the first closure and passageways for directing the liquid mixture between adjacent tapered rollers to the abutment means against which the tapered rollers bear, all under the influence of centrifugal force generated by rotation of the cage.

22. The combination according to claim 21 wherein the passageways also direct the liquid mixture against the cup raceway.

23. The combination according to claim 21 wherein the second closure includes a cavity located opposite the large ends of the rollers; wherein the port leads away from the cavity; and wherein the cage has blades which pass through the cavity in the second closure to move vaporized refrigerant to the port in the second closure.

24. The combination according to claim 21 wherein the second closure includes a cavity located opposite the large ends of the rollers and wherein the port leads away from the cavity, and further comprising an impeller mounted for rotation with the spindle and located within the cavity for directing vaporized refrigerant to the port of the second enclosure.

25. The combination according to claim 21 wherein the first closure contains a cavity that is located opposite to the small ends of the tapered rollers, and the means for collecting the liquid mixture includes an end ring on the cage and projected into the second cavity of the first closure, the end ring having a groove which opens toward the axis of the bearing and is located opposite the discharge end of the channel, and wherein the passageways in the cage open at one end into the groove.

26. The combination according to claim 9 and further comprising rotating blades in the isolated space for moving the refrigerant when it is vaporized.

* * * * *

UNITED STATES PATENT AND TRADEMARK OFFICE
CERTIFICATE OF CORRECTION

PATENT NO. : 4,541,738
DATED : September 17, 1985
INVENTOR(S) : Robert L. Leibensperger and Karl W. Reed It is certified that error appears in the above-identified patent and that said Letters Patent are hereby corrected as shown below:

Column 9, line 15, "to claim 6" should be "to claim 7".

Signed and Sealed this

Third Day of December 1985

[SEAL]

Attest:

Attesting Officer

DONALD J. QUIGG

Commissioner of Patents and Trademarks